US011921841B2

(12) United States Patent
Iorga et al.

(10) Patent No.: US 11,921,841 B2
(45) Date of Patent: Mar. 5, 2024

(54) SECURE UPDATING OF STRONG PASSWORDS IN A COMPOSABLE SYSTEM

(71) Applicant: LENOVO GLOBAL TECHNOLOGY (UNITED STATES) INC., Morrisville, NC (US)

(72) Inventors: Radu Mihai Iorga, Bucharest (RO); Bogdan-Cosmin Chifor, Bucharest (RO); Anda-Maria Nicolae, Bucharest (RO); Crina-Elena Untea, Buzau (RO); Corneliu-Ilie Calciu, Bucharest (RO)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 245 days.

(21) Appl. No.: 17/490,088

(22) Filed: Sep. 30, 2021

(65) Prior Publication Data

US 2023/0095212 A1    Mar. 30, 2023

(51) Int. Cl.
*G06F 21/46* (2013.01)
(52) U.S. Cl.
CPC .................................. *G06F 21/46* (2013.01)
(58) Field of Classification Search
CPC .......................................................... G06F 21/46
See application file for complete search history.

(56) References Cited

U.S. PATENT DOCUMENTS

| 9,189,285 B2* | 11/2015 | Ng | H04N 21/6125 |
| 11,706,082 B1* | 7/2023 | Ivanov | H04L 43/045 |
| | | | 709/224 |
| 2013/0238805 A1* | 9/2013 | Catrein | H04L 47/70 |
| | | | 709/226 |
| 2016/0134505 A1* | 5/2016 | Crudele | H04L 47/83 |
| | | | 709/224 |
| 2023/0198856 A1* | 6/2023 | Zhang | H04L 12/66 |
| | | | 709/224 |

* cited by examiner

*Primary Examiner* — James R Turchen

(57) ABSTRACT

Secure updating of strong passwords in a composable system, includes: during deployment of the composable system, requesting, by a central controller in the composable system, device information from a device vendor, the device information specifying a number of expected devices for the composable system; checking, by the central controller, a number of discovered devices against the number of expected devices; only upon discovering all the expected devices, updating, by the central controller, a password for all the devices in the composable system; and upon discovering fewer than the total number of expected devices, halting, by the central controller, deployment of the composable system.

19 Claims, 4 Drawing Sheets

SECURE UPDATING OF STRONG PASSWORDS IN A COMPOSABLE SYSTEM

BACKGROUND

Field of the Invention

The field of the invention is managing security in composable systems, or, more specifically, methods, apparatus, and products for secure updating of strong passwords in a composable system.

Description Of Related Art

In current computing environments, computing systems including composable systems may have multiple servers, compute nodes, storage nodes, and network nodes. A composable system enables dynamic provisioning and allocation of hardware resources including compute, storage, and networking resources. These resources are abstracted from their physical locations and can be managed by software through a web-based interface. Composable systems enable data center resources to be readily available as cloud services. Such composable systems may be the foundation for many private and hybrid cloud solutions.

When deploying a composable system (provisioning and allocating particular hardware resources), a central controller may change the default password for each hardware resource in the composable system to a more secure password. Some devices, however, may be offline or otherwise unavailable when the password is changed, leaving some devices in the composable system without an updated password and presenting security issues in the system.

SUMMARY

Methods, systems, and apparatus for secure updating of strong passwords in a composable system are disclosed in this specification. Such secure password updates may be carried out during deployment of the composable system and include: requesting, by a central controller in the composable system, device information from a device vendor, the device information specifying a number of expected devices for the composable system; checking, by the central controller, a number of discovered devices against the number of expected devices; only upon discovering all the expected devices, updating, by the central controller, a password for all the devices in the composable system; and upon discovering fewer than the total number of expected devices, halting, by the central controller, deployment of the composable system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Exemplary methods, apparatus, and products for secure updating of strong passwords in a composable system in accordance with the present disclosure are described with reference to the accompanying drawings, beginning with FIG. 1. As explained above, a composable system enables dynamic deployment, including provisioning and allocation, of hardware resources such a compute, storage, networking resources and the like, typically through a software interface. In some systems, a central controller operates to manage various aspects of the composable system. For example, a central controller may be configured to update default passwords of the various hardware resources of a composable system during initial deployment of that system.

Figure 1:
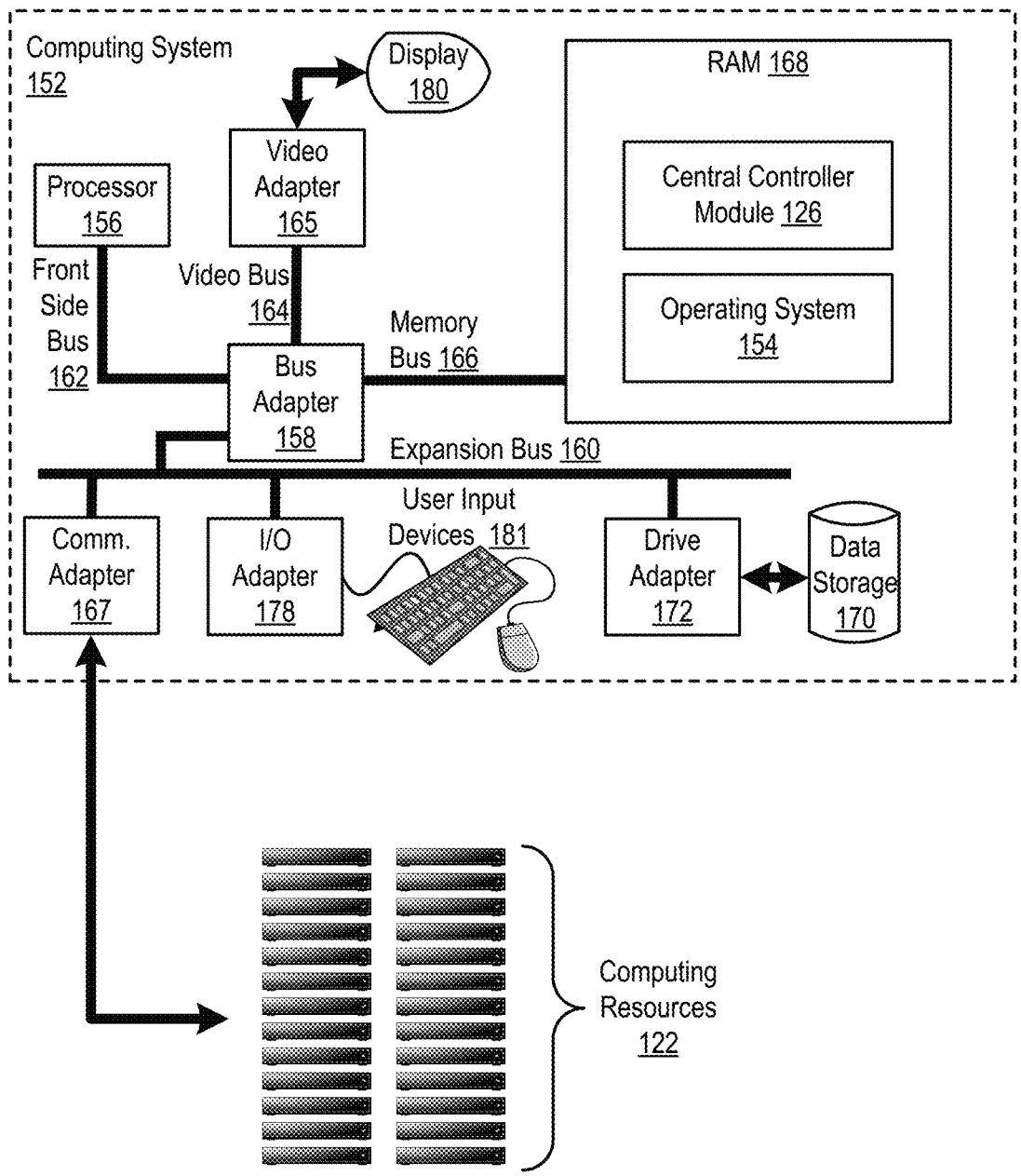
FIG. 1 sets forth a block diagram of an example system configured for secure updating of strong passwords in a composable system according to embodiments of the present disclosure.

That that end, FIG. 1 sets forth a block diagram of automated computing machinery comprising an exemplary computing system (152) that operates as a central controller for secure updating of strong passwords in a composable system according to embodiments of the present disclosure. The computing system (152) of FIG. 1 includes at least one computer processor (156) or "CPU" as well as random access memory (168) ("RAM") which is connected through a high speed memory bus (166) and bus adapter (158) to processor (156) and to other components of the computing system (152).

Stored in RAM (168) of the computing system is a central controller module (126). The central controller module is a module of computer program instructions for secure updating of strong passwords in a composable system according to embodiments of the present disclosure. The central controller module (126), when executed, causes the computing system (152) to operate as a central controller of a composable system. More specifically, the central controller module (126) during deployment of the composable system, requests device information from a device vendor. A device vendor as the term is used here refers to a provider of a hardware device that may be deployed to a composable system. In some composable systems, there may be many different device vendors for the devices in system. To that end, the central controller may request device information from each device vendor represented by devices to be deployed in the composable system. The device information specifies a number of expected devices for the composable system. For example, the device information may specify a number of servers of a particular type, a number of network devices of a particular type, a number of storage devices of a particular type, and the like.

The central controller module (126) then checks a number of discovered devices against the number of expected devices. The central controller may scan the composable system through various means to discover hardware devices that have been initialized during deployment of the composable system. In the example of FIG. 1, the central controller module (126) may scan the network of computing resources (122) to discover devices initialized in the composable system. Devices identified from the scan as initialized in the composable system during deployment are referred to as discovered devices. Some or all of the discovered devices may be configured with a default password provided by the device vendor. Such default passwords are insecure in a composable system and a unique, strong password should be implemented.

The central controller module (126) updates the password for all devices in the composable system only upon discovering all the expected devices. That is, if the number of discovered devices is not equal to the number of expected devices, not all of the devices that are to be deployed in the composable system have, in fact, been initialized to a state in which every device's password can be updated. If the central controller module (126) were to update the password in less than all of the expected devices, it is possible that additional devices will be deployed after the update, leaving one or more devices deployed in the composable system with a default or insecure password configuration.

Upon discovering fewer than the total number of expected devices, the central controller module (126) halts deployment of the composable system. That is, rather than continuing deployment with a possible security vulnerability, the central controller module (126) halts deployment. In some implementations, the central controller module (126) also notifies a user (e.g. a systems administrator managing the deployment of the composable system) that the deployment has been halted. In this way, the user may identify the devices that were not initialized, determine the cause of the failure to initialize, and correct the cause before proceeding with the password update.

Also stored in RAM (168) is an operating system (154). Operating systems useful in computers configured for secure updating of strong passwords in a composable system according to embodiments of the present disclosure include UNIX™, Linux™, Microsoft Windows™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for secure updating of strong passwords in a composable system according to embodiments of the present disclosure include Integrated Drive Electronics ("IDE") adapters, Small Computer System Interface ("SCSI") adapters, and others as will occur to those of skill in the art. Non-volatile computer memory also may be implemented as an optical disk drive, Flash memory, and the like as will occur to those of skill in the art.

The example computing system (152) of FIG. 1 includes one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (165), which is an example of an I/O adapter specially designed for graphic output to a display device (180) such as a display screen or computer monitor. Video adapter (165) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ("USB"), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for secure updating of strong passwords in a composable system according to embodiments of the present disclosure include modems for wired dial-up communications, Ethernet (IEEE 802.3) adapters for wired data communications, and 802.11 adapters for wireless data communications.

The communications adapter (167) of the exemplary computing system (152) of FIG. 1 is connected to computing resources (122) locally or remotely via the Internet, i.e., the cloud. The computing resources (122) are a collection of resources or devices able to be arranged, i.e., composable, into different configurations based on the data center requirements. Examples of computing resources (122) include servers, compute nodes, memory, accelerators including GPUs and FPGAs, communications adapters, I/O adapters, drive adapters, and storage devices such as platter drives and solid state drives.

Figure 2:
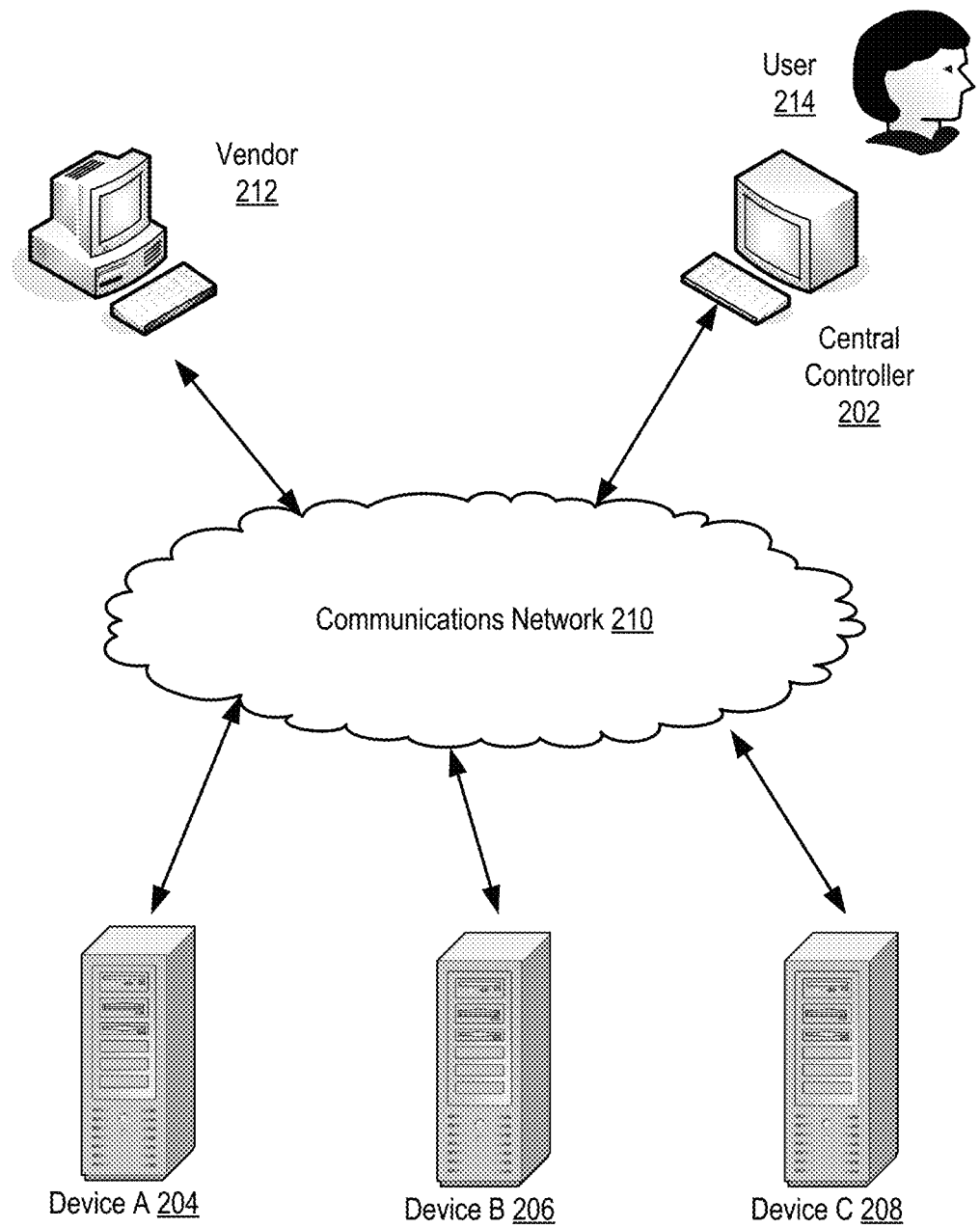
FIG. 2 sets forth a diagram for secure updating of strong passwords in a composable system according to embodiments of the present disclosure.

For further explanation, FIG. 2 is an example diagram of a system configured for secure updating of strong passwords in a composable system according to embodiments of the present disclosure. FIG. 2 includes a central controller (202) coupled for data communications through a data communications network (210) such as the Internet to a device vendor (212) and various devices (204, 206, 208). In the example of FIG. 2, device A (204), device B (206), and device C (208) may be implemented as a variety of devices including, for example, servers, compute nodes, storage nodes, smart appliances, smart lightbulbs, or other devices that are part of the Internet of Things.

A user (214) such as an administrator manages the central controller (202). Although FIG. 2 shows the central controller and computing resources in one particular configuration, other combinations of additional devices, not shown, and servers, compute nodes, storage nodes and network nodes are possible.

When a composable system is initially deployed, a central controller discovers resources or devices. Devices are allocated flexibly according to need. The central controller may not have information on how many devices are in the composable system. When all devices are online, then the central controller will discover all devices, and when some devices are not online during the discovery process, due to connectivity issues, hardware issues, or other issues, then the central controller will initially discover fewer than all devices in the composable system.

Some devices may be deployed in the composable system with a default password. When the composable system is being deployed, the central controller changes the password for all device to a new password for security. As noted above, when fewer than all devices are online during the initial discovery process, then fewer than all devices will receive the updated password. The composable system will thus have more than one password when the remaining devices come online, some devices with a default password, leading to potential security issues. In embodiments of the present disclosure, the central controller halts deployment of the composable system until all devices are discovered, so that all devices receive the updated password together.

Figure 3:
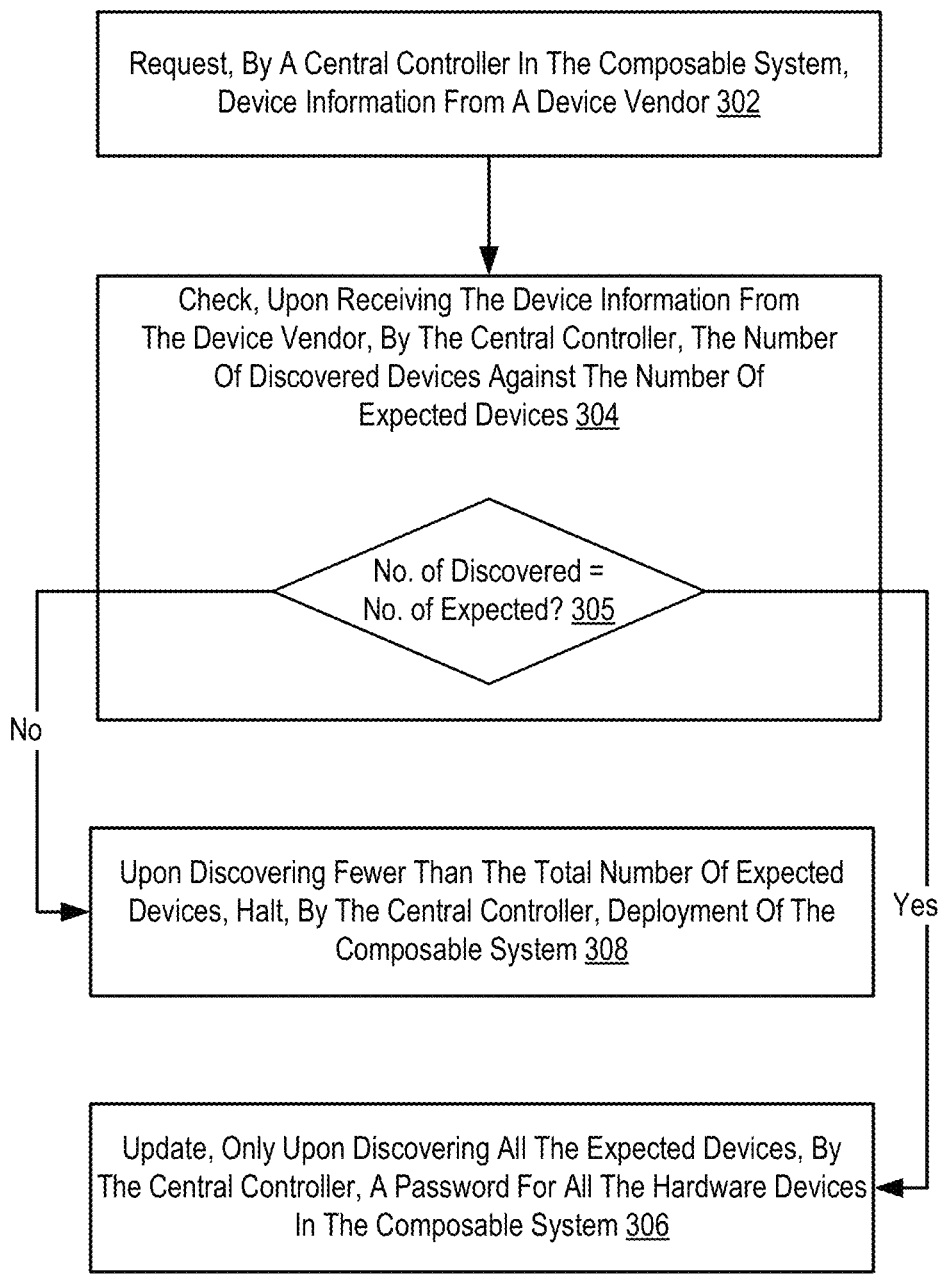
FIG. 3 sets forth a flow chart illustrating an exemplary method for secure updating of strong passwords in a composable system according to embodiments of the present disclosure.

For further explanation, FIG. 3 sets forth a flow chart illustrating an exemplary method for secure updating of strong passwords in a composable system according to embodiments of the present invention. The method of FIG. 3 is carried out during initial deployment of a composable system. Additionally, the composable system referred to in FIG. 3 may implement a private or hybrid cloud.

The method of FIG. 3 includes requesting (302), by a central controller in the composable system, device information from a device vendor. In the method of FIG. 3, the central controller (202) requests device information during initial deployment of the composable system. Requesting (302) such device information from a device vendor includes the central controller (202) requesting information about how many devices and type of devices have been supplied by the vendor (212) for the composable system. The central controller (202) may request the information directly from the vendor (212) by communicating across the communications network 210 or may request the information from an administrator (214). In a composable system with devices that are all the same type from the same vendor, or more than one type from the same vendor, the central controller (202) requests device information directly or indirectly from the vendor (212). In a composable system with devices from two vendors, then the central controller (202) requests device information from the two vendors. In a composable system with devices from more than two vendors, then the central controller (202) requests device information from the device vendors. In some embodiments, each vendor (212) provides a portal or API through which such requests may be provided.

FIG. 3 also includes checking (304), upon receiving the device information from the device vendor, the number of discovered devices against the number of expected devices. Checking (304) the number of discovered devices against the number of expected devices includes determining (305) whether the number of discovered devices is equal to the number of expected devices based on the device information received from the vendor(s).

If (and only if) the number of discovered devices is equal to the number of expected devices, the method of FIG. 3 continues by updating (306) a password for all the hardware devices in the composable system. Updating (306) a password for all the hardware devices in the composable system may be carried out by replacing the default password of all devices in the composable system with a common, strong password.

In the method of FIG. 3, if the number of discovered devices is less than the number of expected devices, the method of FIG. 3 continues by halting (308) deployment of the composable system. In this way, the method of FIG. 3 ensures that the composable system is not fully deployed and operational in a state in which devices with insecure, default passwords may be added later.

Figure 4:
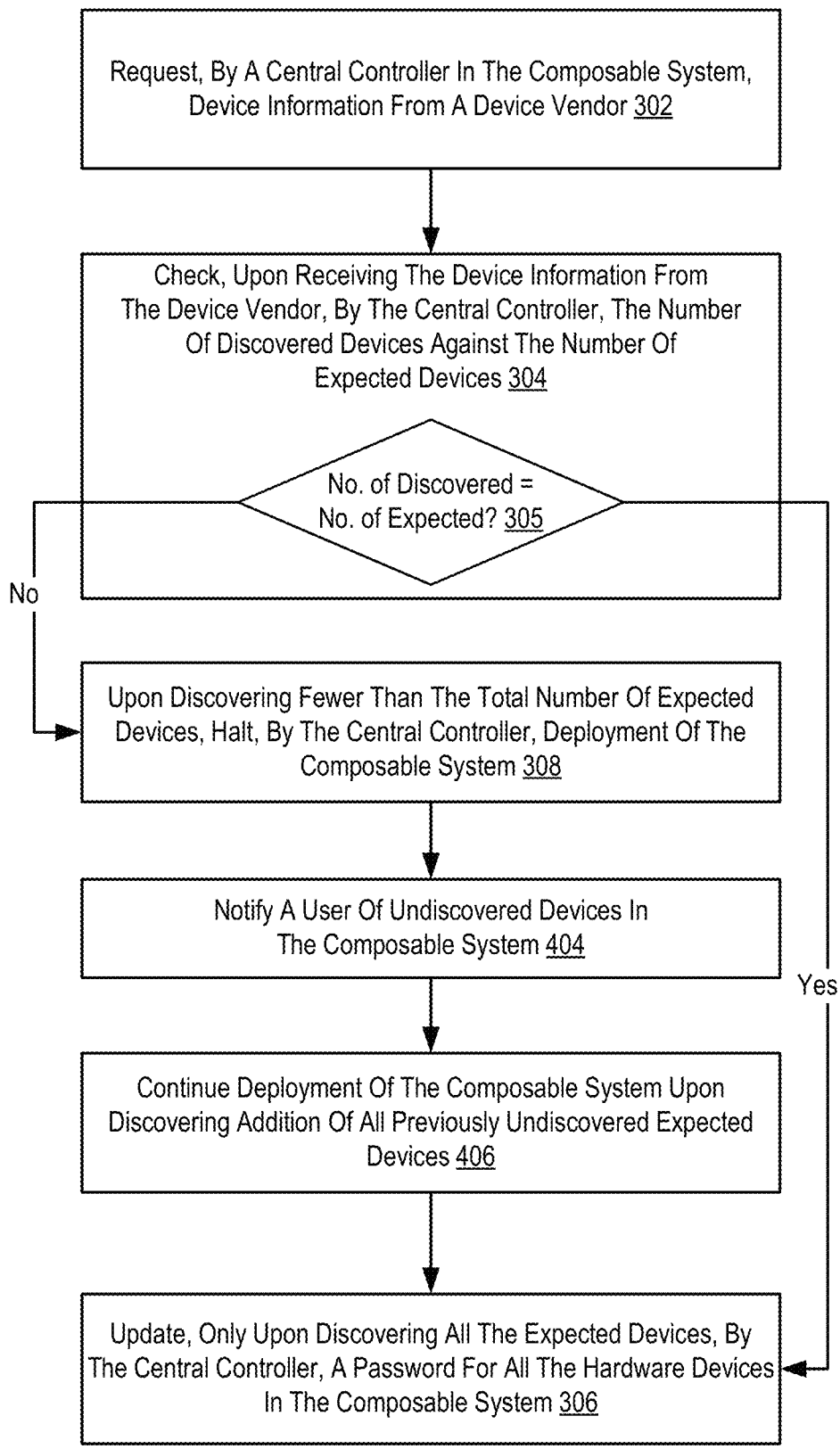
FIG. 4 sets forth a flow chart illustrating an exemplary method for secure updating of strong passwords in a composable system according to embodiments of the present disclosure.

For further explanation, FIG. 4 sets forth a flow chart illustrating a further exemplary method for secure updating of strong passwords in a composable system according to embodiments of the present invention. The method of FIG. 4 is similar to the method of FIG. 3, except that after halting (308) the deployment of the composable system, the method of FIG. 4 includes notifying (404) a user of undiscovered devices in the composable system. Notifying (404) a user of undiscovered devices in the composable system may include the central controller (202) sending an alert in the form of an SMS (Short Message Service) message or email to an administrator (214) that one or more devices are not discovered in the composable system. The central controller (202) may notify the user (214) of the number and type of undiscovered device. In some embodiments, the administrator (214) may remedy the undiscovered device or devices by querying the undiscovered device or devices or by fixing the problem. That is, the administrator may bring the device or devices online. When the undiscovered device or devices are online, then the central controller (202) continues (406) deployment of the composable system including going through the discovery and update process.

In view of the explanations set forth above, readers will recognize that the benefits of secure updating of strong passwords in a composable system according to embodiments of the present invention include:

Providing secure updating of strong passwords in a composable system,

Preventing a window of vulnerability in a composable system having devices with default passwords, and Preventing a window of vulnerability in a composable system having devices with multiple passwords.

Exemplary embodiments of the present invention are described largely in the context of a fully functional computer system for secure updating of strong passwords in a composable system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for secure updating of strong passwords in a composable system, the method comprising:
    during deployment of the composable system, requesting, by a central controller in the composable system, device information from a device vendor, the device information specifying a number of expected devices for the composable system;
    checking, by the central controller, a number of discovered devices against the number of expected devices;
    only upon discovering all the expected devices, updating, by the central controller, a password for all the devices in the composable system; and
    upon discovering fewer than the number of expected devices, halting, by the central controller, deployment of the composable system.

2. The method of claim 1 wherein updating the password comprises changing a default password of each of the devices in the composable system to a non-default password.

3. The method of claim 1 further comprising notifying a user of undiscovered devices in the composable system.

4. The method of claim 1 wherein the central controller requests device information through a portal provided by the device vendor.

5. The method of claim 1 further comprising continuing deployment of the composable system upon discovering addition of all previously undiscovered expected devices.

6. The method of claim 1 wherein the composable system comprises a composable private cloud.

7. An apparatus for secure updating of strong passwords in a composable system, the apparatus comprising a computer processor, a computer memory operatively coupled to the computer processor, the computer memory having disposed within it computer program instructions that, when executed by the computer processor, cause the apparatus to perform operations comprising:
   during deployment of the composable system, requesting, by a central controller in the composable system, device information from a device vendor, the device information specifying a number of expected devices for the composable system;
   checking, by the central controller, a number of discovered devices against the number of expected devices;
   only upon discovering all the expected devices, updating, by the central controller, a password for all the devices in the composable system; and
   upon discovering fewer than the number of expected devices, halting, by the central controller, deployment of the composable system.

8. The apparatus of claim 7, wherein updating the password comprises changing a default password of each of the devices in the composable system to a non-default password.

9. The apparatus of claim 7, the operations further comprising notifying a user of undiscovered devices in the composable system.

10. The apparatus of claim 7 wherein the central controller requests device information through a portal provided by the device vendor.

11. The apparatus of claim 7, the operations further comprising continuing deployment of the composable system upon discovering addition of all previously undiscovered expected devices.

12. The apparatus of claim 7 wherein the composable system comprises a composable private cloud.

13. A computer program product for secure updating of strong passwords in a composable system, the computer program product comprising a non-volatile computer readable medium and non-transitory computer program instructions embodied therein, the program instructions being executable by a computer to perform operations comprising:
   during deployment of the composable system, requesting, by a central controller in the composable system, device information from a device vendor, the device information specifying a number of expected devices for the composable system;
   checking, by the central controller, a number of discovered devices against the number of expected devices;
   only upon discovering all the expected devices, updating, by the central controller, a password for all the devices in the composable system; and
   upon discovering fewer than the total number of expected devices, halting, by the central controller, deployment of the composable system.

14. The computer program product of claim 13, wherein updating the password comprises changing a default password of each of the devices in the composable system to a non-default password.

15. The computer program product of claim 13, the operations further comprising notifying a user of undiscovered devices in the composable system.

16. The computer program product of claim 13 wherein the central controller requests device information through a portal provided by the device vendor.

17. The computer program product of claim 13, the operations further comprising continuing deployment of the composable system upon discovering addition of all previously undiscovered expected devices.

18. The computer program product of claim 13 wherein the composable system comprises a composable private cloud.

19. The computer program product of claim 13 wherein the computer readable medium comprises a storage medium.

* * * * *